(12) United States Patent
Blüm et al.

(10) Patent No.: US 12,054,644 B2
(45) Date of Patent: Aug. 6, 2024

(54) UNIVERSAL ADHESION PROMOTER BASED ON ORGANOFUNCTIONAL MODIFIED POLYBUTADIENES

(71) Applicant: Evonik Operations GmbH, Essen (DE)

(72) Inventors: Jana Blüm, Essen (DE); Michael Fiedel, Essen (DE); Annett Halbhuber, Krefeld (DE); Stefanie Redeker, Hattingen (DE); Frank Schubert, Neukirchen-Vluyn (DE); Sarah Otto, Essen (DE)

(73) Assignee: Evonik Operations GmbH, Essen (DE)

( * ) Notice: Subject to any disclaimer, the term of this patent is extended or adjusted under 35 U.S.C. 154(b) by 178 days.

(21) Appl. No.: 17/804,049

(22) Filed: May 25, 2022

(65) Prior Publication Data
US 2022/0396706 A1    Dec. 15, 2022

(30) Foreign Application Priority Data
May 27, 2021   (EP) .................... 21176162

(51) Int. Cl.
C09D 7/65      (2018.01)
C08F 36/06     (2006.01)
C09D 175/06    (2006.01)

(52) U.S. Cl.
CPC ............... C09D 7/65 (2018.01); C08F 36/06 (2013.01); C09D 175/06 (2013.01); C08F 2810/00 (2013.01)

(58) Field of Classification Search
CPC .......... C09D 7/65; C09D 175/06; C08F 36/06
USPC ...................................................... 524/507
See application file for complete search history.

(56) References Cited

U.S. PATENT DOCUMENTS

| | | | |
|---|---|---|---|
| 3,725,492 A | 4/1973 | Ukita et al. | |
| 4,182,814 A | 1/1980 | Bernemann et al. | |
| 4,239,807 A | 12/1980 | Feldmann et al. | |
| 6,218,477 B1 | 4/2001 | Paulen et al. | |
| 6,353,060 B1 | 3/2002 | Paulen et al. | |
| 8,921,437 B2 | 12/2014 | Knott et al. | |
| 9,550,928 B2 | 1/2017 | Lobert et al. | |
| 10,087,278 B2 | 10/2018 | Lobert et al. | |
| 10,851,189 B2 | 12/2020 | Kranning et al. | |
| 11,365,270 B2 | 6/2022 | Kranning et al. | |
| 2010/0071849 A1 | 3/2010 | Knott et al. | |
| 2015/0307640 A1 | 10/2015 | Berlineanu et al. | |
| 2016/0053145 A1 | 2/2016 | Lobert et al. | |
| 2017/0174956 A1* | 6/2017 | Ramon-Gimenez | C09J 5/06 |
| 2017/0226285 A1 | 8/2017 | Lobert et al. | |
| 2019/0315895 A1 | 10/2019 | Kranning et al. | |
| 2021/0024666 A1 | 1/2021 | Kranning et al. | |
| 2023/0018204 A1 | 1/2023 | Schubert et al. | |

FOREIGN PATENT DOCUMENTS

| | | |
|---|---|---|
| CN | 104231996 | 12/2014 |
| DE | 2053484 | 5/1972 |
| DE | 2158878 | 6/1973 |
| DE | 2526366 | 12/1976 |
| DE | 2731067 | 1/1979 |
| DE | 3014196 | 10/1981 |
| EP | 2805981 | 11/2014 |
| EP | 3184568 | 6/2017 |
| WO | 2005/100482 | 10/2005 |
| WO | 2012/130674 | 10/2012 |
| WO | 2014/075901 | 5/2014 |
| WO | 2021/105037 | 6/2021 |

(Continued)

OTHER PUBLICATIONS

U.S. Office Action dated Jun. 23, 2023, in U.S. Appl. No. 17/756,423, 14 pages.

(Continued)

Primary Examiner — Deve V Hall
(74) Attorney, Agent, or Firm — Grüneberg and Myers PLLC

(57) ABSTRACT

A universal adhesion promoter contains a compound based on polybutadiene having at least one repeat unit selected from the following divalent radicals:

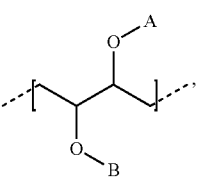

(U)

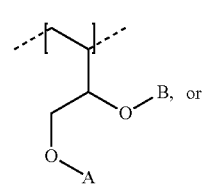

(V)

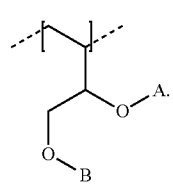

(W)

20 Claims, 1 Drawing Sheet

(56) References Cited

FOREIGN PATENT DOCUMENTS

WO 2022/073823 4/2022

OTHER PUBLICATIONS

U.S. Appl. No. 17/756,423, filed May 25, 2022, U.S. Pat. No. 2023/0018204, Schubert et al.
Lobert et al., U.S. Appl. No. 18/563,143, filed Nov. 21, 2023.
U.S. Appl. No. 18/563,143, filed Nov. 21, 2023, Lobert et al.
Lobert et al., U.S. Appl. No. 18/564,035, filed Nov. 24, 2023.
U.S. Appl. No. 18/564,035, filed Nov. 24, 2023, Lobert et al.
U.S. Appl. No. 14/410,326, filed Dec. 22, 2014, Berlineanu et al..
European Search Report dated Nov. 25, 2021, in European Application No. 21176162.2, 6 pages.
Gao et al., "Facile Synthesis of Amphiphilic Heterografted Copolymers with Crystalline and Amorphous Side Chains", Macromolecular Chemistry and Physics, vol. 214, 2014, pp. 1677-1687.

* cited by examiner

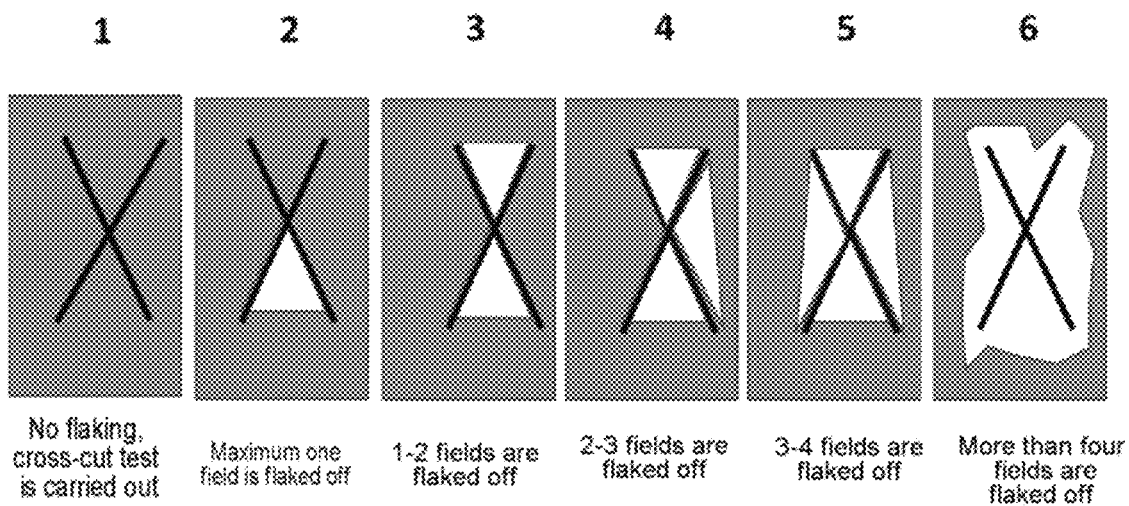

UNIVERSAL ADHESION PROMOTER BASED ON ORGANOFUNCTIONAL MODIFIED POLYBUTADIENES

CROSS-REFERENCE TO RELATED APPLICATIONS

This application claims priority to European Application No. 21176162.2, filed on May 27, 2021, the content of which is hereby incorporated by reference in its entirety.

BACKGROUND OF THE INVENTION

Field of the Invention

The present invention relates to a universal adhesion promoter comprising a compound based on organofunctional modified polybutadienes.

Description of Related Art

Modern material sciences generate an ever-increasing number of composite and hybrid materials and also new coating compositions in the ever accelerating process of innovation. From this stems a great demand for innovative adhesion promoters, the object of which is firstly to establish affinity for these same novel surfaces and at the same time to have excellent compatibility with the coating matrix to be applied, in order to produce a good adhesive bond to the materials.

Composite and hybrid materials and surfaces thereof, underlying surface and substrate are used synonymously here.

Adhesion arises predominantly through binding forces between molecules of the coating film or of the coating composition and the underlying surface. If the adhesion is insufficient, there are various possibilities to deal with or influence this interface. The surface of the substrate/underlying surface may be modified by sanding, flaming or corona treatment, a further layer ("adhesion primer") between substrate and coating film may be introduced or adhesion may be induced in the coating film by adding specific adhesion resins or adhesion promoters.

Adhesion promoters are constituents of the coating layer and must have moieties which can form strong interactions with the substrate on the one hand and parallel thereto ensure good embedding into the coating matrix, without adversely affecting other coating properties.

The adhesion promoters known in the prior art may be subdivided into functionalized polymers and organics and also coupling agents more broadly. While in the functionalized polymers, besides functionalized polyethylene/polypropylene, included are functionalized styrene-butadiene rubbers and organic resins, the functionalized organics are essentially amine compounds and acrylates. The group of the coupling agents consists mainly of organomodified silanes, zirconates and titanates.

EP3184568A1 describes an adhesive formulation comprising acrylate-terminated urethane-polybutadienes, which may be prepared from the reaction of monoadducts of reactive olefinic compounds, diisocyanates and hydroxy-terminated polybutadienes.

WO 2014/001300 discloses polybutadienes having terminal epoxy groups, which are used as binder in adhesive compositions for automotive applications.

Adhesion promoters composed of unmodified polybutadienes are also known from the prior art. These already exhibit good adhesion performance but they have the disadvantage that their compatibility cannot be adjusted or only to a very limited extent.

It is therefore desirable to provide an adhesion promoter which allows broad adjustment of the adhesion performance and compatibility, and overcomes at least one disadvantage of the prior art.

SUMMARY OF THE INVENTION

The object of the present invention, therefore, was to provide an adhesion promoter, which exhibits good adhesion to surfaces, but at the same time bears a modification with the help of which it is possible to adjust the compatibility according to the underlying surfaces.

To achieve the object, therefore, a universal adhesion promoter is proposed comprising a compound based on polybutadiene having at least one repeat unit selected from the group consisting of the divalent radicals

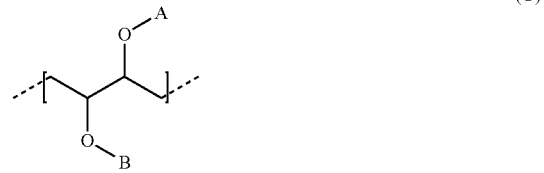

(U)

(V)

(W)

wherein

A is in each case independently a monovalent organic radical or a hydrogen radical, preferably in each case independently selected from the group consisting of monovalent hydrocarbon radicals having 1 to 6 carbon atoms,
more preferably in each case independently selected from the group consisting of alkyl radicals having 1 to 4 carbon atoms;

B is in each case independently selected from the group consisting of radicals of the formula (4a),

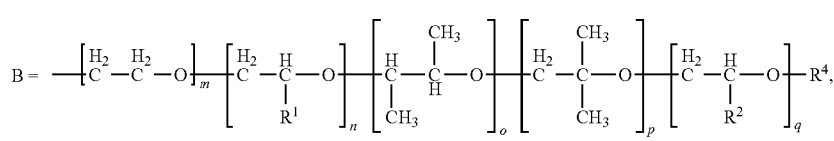

Formula (4a)

preferably in each case independently selected from the group consisting of radicals of the formula (4b)

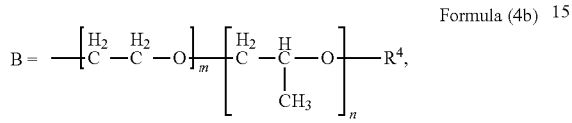

Formula (4b)

more preferably in each case independently selected from the group consisting of radicals of the formula (4c)

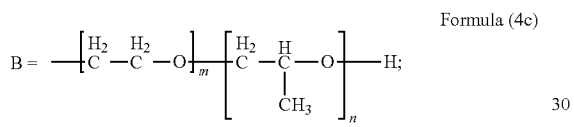

Formula (4c)

$R^1$ is in each case independently selected from the group consisting of monovalent hydrocarbon radicals having 1 to 16 carbon atoms, preferably in each case independently an alkyl radical having 1 to 16 carbon atoms or a phenyl radical, more preferably in each case independently a methyl radical, an ethyl radical or a phenyl radical;

$R^2$ is a radical of the formula —$CH_2$—O—$R^3$;

$R^3$ is in each case independently selected from the group consisting of monovalent hydrocarbon radicals having 3 to 18 carbon atoms;

preferably each independently an allyl radical, a butyl radical, an alkyl radical having 8 to 15 carbon atoms or a phenyl radical that may be substituted by monovalent radicals selected from hydrocarbon radicals having 1 to 4 carbon atoms;

more preferably a tert-butylphenyl radical or an o-cresyl radical;

$R^4$ is each independently a monovalent organic radical having 1 to 18 carbon atoms or hydrogen, preferably hydrogen;

and m, n, o, p and q are each independently 0 to 300, preferably 0 to 200, more preferably 0 to 100, with the proviso that the sum total of m, n, o, p and q is greater than 1, preferably greater than 5, more preferably greater than 10;

the radical B has at least one repeat unit in accordance with

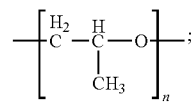

including every permutation of the repeat units in the radical B.

The invention also includes the following embodiments:

1. Universal adhesion promoter comprising a compound based on polybutadiene having at least one repeat unit selected from the group consisting of the divalent radicals

(U)

(V)

(W)

wherein

A is in each case independently a monovalent organic radical or a hydrogen radical, preferably in each case independently selected from the group consisting of monovalent hydrocarbon radicals having 1 to 6 carbon atoms, more preferably in each case independently selected from the group consisting of alkyl radicals having 1 to 4 carbon atoms;

B is in each case independently selected from the group consisting of radicals of the formula (4a)

Formula (4a)

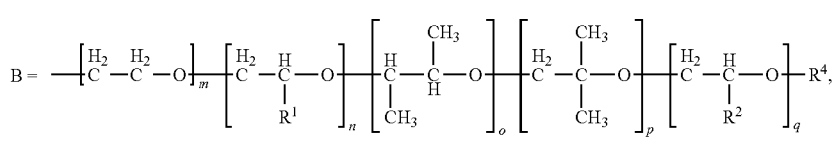

preferably in each case independently selected from the group consisting of radicals of the formula (4b)

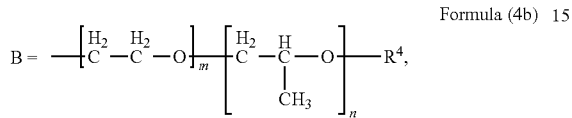

more preferably in each case independently selected from the group consisting of radicals of the formula (4c)

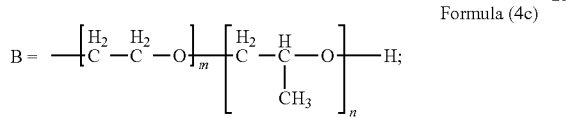

$R^1$ is in each case independently selected from the group consisting of monovalent hydrocarbon radicals having 1 to 16 carbon atoms,
preferably in each case independently an alkyl radical having 1 to 16 carbon atoms or a phenyl radical,
more preferably in each case independently a methyl radical, an ethyl radical or a phenyl radical;
$R^2$ is a radical of the formula —$CH_2$—O—$R^3$;
$R^3$ is in each case independently selected from the group consisting of monovalent hydrocarbon radicals having 3 to 18 carbon atoms;
preferably each independently an allyl radical, a butyl radical, an alkyl radical having 8 to 15 carbon atoms or a phenyl radical that may be substituted by monovalent radicals selected from hydrocarbon radicals having 1 to 4 carbon atoms;
more preferably a tert-butylphenyl radical or an o-cresyl radical;
$R^4$ is each independently a monovalent organic radical having 1 to 18 carbon atoms or hydrogen, preferably hydrogen;
and
m, n, o, p and q are each independently 0 to 300, preferably 0 to 200, more preferably 0 to 100, with the proviso that the sum total of m, n, o, p and q is greater than 1, preferably greater than 5, more preferably greater than 10;
the radical B has at least one repeat unit in accordance with

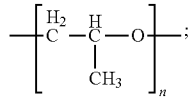

including every permutation of the repeat units in the radical B.
2. Adhesion promoter according to embodiment 1, characterized in that m, n, o, p and q are each independently 0 to 100, preferably 0 to 70, more preferably 0 to 50, with the proviso that the sum total of m, n, o, p and q is greater than 1, preferably greater than 5, more preferably greater than 10.
3. Adhesion promoter according to either of the preceding embodiments, characterized in that the number-average molar mass $M_n$ of the polybutadiene moiety is from 200 g/mol to 20 000 g/mol, preferably from 500 g/mol to 10 000 g/mol, more preferably from 700 g/mol to 5000 g/mol.
4. Adhesion promoter according to any of the preceding embodiments, characterized in that the polybutadiene moiety has 0% to 80%, preferably 0% to 30%, more preferably 0% to 10%, especially preferably 0% to 5% of the double bonds present as 1,2 vinyl double bonds, and 20% to 100%, preferably 70% to 100%, more preferably 90% to 100%, especially preferably 95% to 100% of the double bonds present as 1,4 double bonds.
5. Adhesion promoter according to any of the preceding embodiments, characterized in that the average molar mass of the radical B is from 100 g/mol to 10 000 g/mol, preferably from 200 g/mol to 7500 g/mol, more preferably from 400 g/mol to 5000 g/mol.
6. Adhesion promoter according to any of the preceding embodiments, characterized in that the compound was prepared based on linear polybutadienes.
7. Adhesion promoter according to any of the preceding embodiments, characterized in that the compound has no pendant (in comb position) polybutadienes.
8. Adhesion promoter according to any of the preceding embodiments, characterized in that the compound has exclusively pendant (in comb position) repeat units (U), (V) and/or (W).
9. Use of the adhesion prompter according to any of the preceding embodiments for preparing an adhesion promoter composition.
10. Use of the adhesion promoter according to any of the preceding embodiments or of the adhesion promoter composition according to embodiment 9 for producing coating materials, such as dispersions, millbases, paints, coatings or printing inks, inkjet, grind resins, pigment concentrates, colour preparations, pigment preparations, filler preparations or coating compositions, sealant and adhesive compositions.
11. Process comprising applying a curable film-forming composition comprising an adhesion promoter according to any of the preceding embodiments or an adhesion promoter composition according to embodiment 9 to a substrate.
12. Process according to embodiment 11, wherein the substrate is metal, concrete, wood, glass, plastic and/or a composite material such as glass fibre and/or carbon fibre composite.

BRIEF DESCRIPTION OF THE DRAWING

The FIGURE shows an evaluation of the Andreas Cut test.

DETAILED DESCRIPTION OF THE INVENTION

Adhesion promoter is also known under the term adhesion additive and/or adhesion resin.

The subject matter of the invention is described by way of example below but without any intention that the invention be restricted to these illustrative embodiments. Where ranges, general formulae or classes of compounds are specified below, these are intended to encompass not only the corresponding ranges or groups of compounds that are explicitly mentioned but also all subranges and subgroups of compounds that can be obtained by removing individual values (ranges) or compounds. Where documents are cited in the context of the present description, the entire content thereof is intended to be part of the disclosure content of the present invention.

Where average values are stated hereinbelow, these values are numerical averages unless otherwise stated. Where measured values, parameters or material properties determined by measurement are stated hereinbelow, these are, unless otherwise stated, measured values, parameters or material properties measured at 25° C. and preferably at a pressure of 101 325 Pa (standard pressure).

Where numerical ranges in the form "X to Y" are stated hereinbelow, where X and Y represent the limits of the numerical range, this is synonymous with the statement "from at least X up to and including Y", unless otherwise stated. Stated ranges thus include the range limits X and Y, unless otherwise stated.

Wherever molecules/molecule fragments have one or more stereocentres or can be differentiated into isomers on account of symmetries or can be differentiated into isomers on account of other effects, for example restricted rotation, all possible isomers are included by the present invention.

All formulae describe compounds or radicals that are constructed from repeat units, for example repeat fragments, blocks or monomer units, and can have a molar mass distribution. The frequency of the repeat units is stated in the form of indices. The indices used in the formulae should be regarded as statistical averages (numerical averages). The indices used and also the value ranges of the reported indices should thus be regarded as averages of the possible statistical distribution of the structures that are actually present and/or mixtures thereof. The various fragments or repeat units of the compounds described in the formulae may be distributed statistically. Statistical distributions have a blockwise structure with any number of blocks and any sequence or are subject to a randomized distribution; they may also have an alternating structure or else form a gradient along the chain, where one is present; in particular they can also give rise to any mixed forms in which groups having different distributions may optionally follow one another. The formulae below include all permutations of repeat units. Where compounds such as polybutadienes (A), epoxy-functional polybutadienes (C), hydroxy-functional polybutadienes (E), polyether-modified polybutadienes (G) or polyether-modified polybutadienes (K) comprising end-capped polyether radicals, that can have multiple instances of different units, are described in the context of the present invention, these may thus occur in these compounds either in an unordered manner, for example in statistical distribution, or in an ordered manner. The figures for the number or relative frequency of units in such compounds should be regarded as an average (numerical average) over all the corresponding compounds. Specific embodiments may lead to restrictions on statistical distributions as a result of the embodiment. For all regions unaffected by such restriction, the statistical distribution is unchanged.

Surprisingly, it has been found that the adhesion promoter according to the invention comprises a compound that is advantageously not based on silicone and also presents the possibility of adjusting the adhesion performance and compatibility. Firstly, the diversity of the polybutadiene could be utilized; secondly, by combining certain topologically different polyethers and the density of functionality thereof on the polybutadiene skeleton, the compatibility could be improved.

The inventor could also establish that the adhesion promoter according to the invention adheres well to different substrates and also has better compatibility than that of an adhesion promoter known from the prior art.

Surprisingly, it was also established that at least one radical B has at least one repeat unit in accordance with

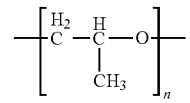

in order to achieve both a satisfactory adhesive effect and a satisfactory compatibility of the adhesion promoter according to the invention.

The adhesion promoter according to the invention preferably comprises a compound where m, n, o, p and q are each independently 0 to 100, preferably 0 to 70, more preferably 0 to 50, with the proviso that the sum total of m, n, o, p and q is greater than 1, preferably greater than 5, more preferably greater than 10.

The compound for the adhesion promoter according to the invention preferably has a number-average molar mass $M_n$ of the polybutadiene moiety of 200 g/mol to 20 000 g/mol, preferably from 500 g/mol to 10 000 g/mol, more preferably from 700 g/mol to 5000 g/mol.

The polybutadiene moiety of the compound preferably has 0% to 80%, preferably 0% to 30%, more preferably 0% to 10%, especially preferably 0% to 5% of the double bonds present as 1,2 vinyl double bonds, and 20% to 100%, preferably 70% to 100%, more preferably 90% to 100%, especially preferably 95% to 100% of the double bonds present as 1,4 double bonds.

The adhesion promoter according to the invention preferably comprises a compound based on linear polybutadienes.

The compound preferably has no pendant (in comb position) polybutadienes.

The compound preferably has exclusively pendant (in comb position) repeat units (U), (V) and/or (W).

The average molar mass of the B radical is preferably from 100 g/mol to 10 000 g/mol, preferably from 200 g/mol to 7500 g/mol, especially preferably from 400 g/mol to 5000 g/mol.

The radicals $R^1$, $R^2$, $R^3$ and $R^4$ may each independently be linear or branched, saturated or unsaturated, aliphatic or aromatic, and substituted or unsubstituted.

The general notation

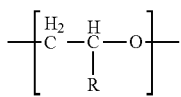

with R=R¹ or R² in formula (4a) or R=CH₃ in the formulae (4b) and (4c) represents either a unit of the formula

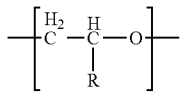

or a for a unit of the formula

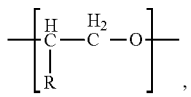

but preferably a unit of the formula

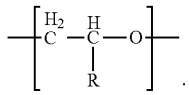

The general notation

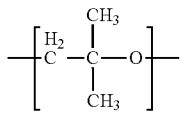

in formula (4a) represents either a unit of the formula

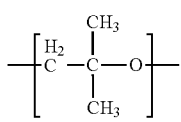

or a for a unit of the formula

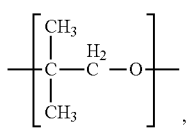

but preferably a unit of the formula

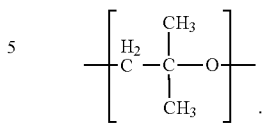

It is further preferable that the $R^4$ radical is in each case independently selected from the group consisting of monovalent hydrocarbon radicals having 1 to 18 carbon atoms, acyl radicals —C(=O)$R^5$, urethane radicals —C(=O)NH—$R^6$, carbonate radicals —C(=O)—$R^7$ and hydrogen; $R^4$ is further preferably in each case independently selected from the group consisting of alkyl radicals having 1 to 18 carbon atoms, alkylene radicals having 1 to 18 carbon atoms, acyl radicals —C(=O)$R^5$, urethane radicals —C(=O)NH—$R^6$, carbonate radicals —C(=O)O—$R^7$ and hydrogen; more preferably, $R^4$ is hydrogen.

$R^5$ is in each case independently an alkyl or alkenyl radical having 1 to 18 carbon atoms, preferably having 1 to 10 carbon atoms, more preferably a methyl radical.

$R^6$ is in each case independently an alkyl or aryl radical having 1 to 18 carbon atoms, preferably having 6 to 18 carbon atoms.

$R^7$ is in each case independently an alkyl radical having 1 to 18 carbon atoms, preferably having 1 or 2 carbon atoms.

The compound preferably also comprises repeat units (Y) and (Z) in accordance with

 (Y)

 (Z)

It is preferable here that the sum total of all repeat units (U), (V) and (W) divided by the sum total of all repeat units (U), (V), (W), (X), (Y) and (Z) in the at least one polyether-modified polybutadiene (G) or (K) is from >0% to 70%, preferably from 1% to 50%, more preferably from 2% to 40%, even more preferably from 3% to 30%, especially preferably from 4% to 20%.

This means that >0% to 70%, preferably 1% to 50%, more preferably from 2% to 40%, even more preferably from 3% to 30%, especially preferably from 4% to 20%, of the entirety of the repeat units (U), (V), (W), (X), (Y) and (Z) are polyether-modified.

The number-average molar mass $M_n$, weight-average molar mass $M_w$ and polydispersity of the polybutadiene component of the polyether-modified polybutadiene (G) or (K) are freely variable. The polybutadiene moiety is understood to mean the component of the polyether-modified polybutadiene (G) or (K) that originates from the polybutadiene (A) used in the process.

It is preferable that the number-average molar mass $M_n$ of the polybutadiene component of the polyether-modified polybutadiene (G) or (K) is from 200 g/mol to 20 000 g/mol, preferably from 500 g/mol to 10 000 g/mol, more preferably from 700 g/mol to 5000 g/mol.

Alternatively, it is preferable that the number-average molar mass $M_n$ of the polybutadiene component of the polyether-modified polybutadiene (G) or (K) is from 2100 g/mol to 20 000 g/mol, especially preferably from 2200 g/mol to 10 000 g/mol, especially preferably from 2300 g/mol to 5000 g/mol.

The number-average molar mass $M_n$ of the polybutadiene component is defined here as the number-average molar mass $M_n$ of the underlying polybutadiene (A).

It is further preferable that the polyether-modified polybutadiene (G) or (K) has a number average 5 to 360, more preferably 10 to 180, most preferably 15 to 90, repeat units, where the repeat units are selected from the group consisting of (U), (V), (W), (X), (Y) and (Z).

Alternatively, it is preferable that the polyether-modified polybutadiene (G) or (K) has a number average 35 to 360, more preferably 40 to 180, most preferably 45 to 90, repeat units, where the repeat units are selected from the group consisting of (U), (V), (W), (X), (Y) and (Z).

It is further preferable that the polyether-modified polybutadienes (G) or (K) are characterized in that 0% to 80%, preferably 0% to 30%, more preferably 0% to 10% and especially preferably 0% to 5% of the double bonds present are 1,2 vinyl double bonds, and 20% to 100%, preferably 70% to 100%, more preferably 90% to 100% and especially preferably 95% to 100% of the double bonds present are 1,4 double bonds.

Preference is therefore given in the context of the invention to compounds of the formula (5) having a content of 0% to 80% 1,2 vinyl double bonds (index a) and 20% to 100% 1,4 double bonds (sum of indices b and c), preferably having 0% to 30% 1,2 vinyl double bonds and 70% to 100% 1,4 double bonds, more preferably having 0% to 10% 1,2 vinyl double bonds and 90% to 100% 1,4 double bonds and especially preferably 0% to 5% 1,2 vinyl double bonds and 95% to 100% 1,4 double bonds, based on the total number of double bond-containing repeat units (sum of a+b+c). The ratio of 1,4-trans double bonds (index b) and 1,4-cis double bonds (index c) is freely variable.

Particularly preferred are compounds of the formula (5) having a content of >95% of repeat units with index d, based on the sum total of repeat units d+e+f. The ratio of repeat units e and f to each other is freely variable.

Especially preferred are those polyether-modified polybutadienes (G) or (K) which are derived from the polybutadienes Polyvest® 110 and Polyvest® 130 from Evonik Industries AG/Evonik Operations GmbH and Lithene ultra AL and Lithene ActiV 50 from Synthomer PLC described above.

The molar mass and polydispersity of the B radicals is freely variable. However, it is preferable that the average molar mass of the B radicals is from 100 g/mol to 20 000 g/mol, preferably from 200 g/mol to 15 000 g/mol, more preferably from 400 g/mol to 10 000 g/mol. The average molar mass of the B radicals may be calculated from the weight of the monomers used based on the number of OH groups of the hydroxy-functional polybutadiene (E) used. Thus, for example, if 40 g of ethylene oxide is used and the amount of the hydroxy-functional polybutadiene (E) used is 0.05 mol of OH groups, the average molar mass of the B radical is 800 g/mol.

The polyether-modified polybutadienes (G) or (K), according to the composition and molar mass, are liquid, pasty or solid.

The number-average molar mass $M_n$ of the polyether-modified polybutadienes (G) or (K) is preferably from 1000 g/mol to 6000 g/mol, further preferably from 1500 g/mol to 5000 g/mol, especially preferably from 2000 g/mol to 4000 g/mol.

Their polydispersity is variable within broad ranges. The polydispersity of the at least one polyether-modified polybutadiene (G) or (K), by the GPC method against PPG standard, is preferably $M_w/M_n$ from 1.5 to 10, further preferably between 2 and 9, more preferably between 3 and 8.

Approaches to the compound based on polybutadiene having at least one repeat unit selected from the group consisting of the divalent radicals (U), (V) and/or (W), as described above, can be taken from the as yet unpublished European patent application EP 19212066.5 or PCT/EP2020/083013.

The as yet unpublished European patent application EP 19212066.5 or PCT/EP2020/083013 addresses the preparation of compounds based on polybutadienes that are suitable as adhesion promoters. A process is described therein comprising the following steps:

a) reacting at least one polybutadiene (A) with at least one epoxidizing reagent (B) to give at least one epoxy-functional polybutadiene (C);

b) reacting the at least one epoxy-functional polybutadiene (C) with at least one hydroxy-functional compound (D) to give at least one hydroxy-functional polybutadiene (E);

c) reacting the at least one hydroxy-functional polybutadiene (E) with at least one epoxy-functional compound (F) to give at least one polyether-modified polybutadiene (G).

It has been disclosed therein that, surprisingly, polybutadienes having a high proportion of 1,4 units and a low content of vinylic 1,2 units, after epoxidation with hydrogen peroxide, can readily be reacted under acid-catalysed ring-opening with OH-functional compounds to give pendantly OH-functional polybutadienes (polybutadienols) and can then be alkoxylated with alkylene oxides.

It is preferable that the process additionally includes at least one of the following optional steps:

d) reacting the at least one polyether-modified polybutadiene (G) with at least one end-capping reagent (H) to give at least one polyether-modified polybutadiene (K) containing end-capped polyether radicals;

e) lightening the colour of the at least one polyether-modified polybutadiene (G) or (K).

The process is preferably further characterized in that in step a) >0% to 70%, preferably 1% to 50%, more preferably 2% to 40%, even more preferably 3% to 30% and especially preferably 4% to 20% of the double bonds of the at least one polybutadiene (A) are epoxidized with the aid of performic acid, which is produced in situ from formic acid and $H_2O_2$;

in step b) one or more short-chain alcohols having 1 to 6 carbon atoms, especially isobutanol, are added onto the epoxy groups of the at least one epoxy-functional polybutadiene (C) under ring opening, preferably using one or more acidic catalysts, especially trifluoromethanesulfonic acid;

in step c) one or more epoxy-functional compounds (F) selected from alkylene oxides and optionally further epoxy-functional monomers are added onto the resultant pendant OH groups of the at least one hydroxy-functional polybutadiene (E) in an alkoxylation reaction, preferably additionally using a Zn/Co double metal cyanide catalyst or basic catalysts such as amines, guanidines, amidines, alkali metal hydroxides or alkali metal alkoxides;

in step d) optionally the at least one polyether-modified polybutadiene (G) is reacted with at least one endcapping reagent (H), selected from the group of carboxylic acids, carboxylic anhydrides, halogenated hydrocarbons, isocyanates and carbonates to give at least one polyether-modified polybutadiene (K) comprising end-capped polyether radicals;

in step e) optionally the colour lightening of the at least one polyether-modified polybutadiene (G) or (K) using activated carbon and/or hydrogen peroxide is carried out.

The process disclosed therein makes it possible for the first time to modify linear polybutadienes by a simple direct alkoxylation on the pendant OH groups with polyether radicals in comb positions. The chain length and monomer sequence in the polyether radical may be varied within wide ranges. The average number of polyether radicals bonded to the polybutadiene is adjustable in a controlled manner via the degree of epoxidation and the hydroxy functionalization, and opens up a great structural variety in the hydroxy-functional polybutadienes (E).

The polybutadienes obtained having polyether radicals in comb positions are preferably essentially free of residual epoxy groups. The process product according to the invention preferably contains essentially no free polyether components. Preferably, essentially all polyethers are chemically attached to the polybutadiene via an ether bond. The process products according to the invention are thus distinctly different from the compounds known to date from the prior art by virtue of their elevated purity.

In order to avoid repetition of the preferred configurations of the preparation process of the as yet unpublished European patent application EP 19212066.5 or PCT/EP2020/083013, reference is hereby made only to the headings of the individual process steps thereof:

The preferred configuration of step a) of the process according to the invention
The preferred configuration of step b) of the process according to the invention
The preferred configuration of step c) of the process according to the invention
DMC catalysis
Base catalysis
Products as starters
Optional step d)
Optional step e)
Reactors The description accordingly disclosed therein is expressly incorporated by way of reference.

As already described above, the compatibility of the adhesion promoter according to the invention may be adjusted by variation and combination of certain topologically different polyethers and the density of functionality thereof on the polybutadiene skeleton. For this reason, step c) is preferably described in detail here:

In step c) of the process according to the invention, the at least one hydroxy-functional polybutadiene (E) is reacted with at least one epoxy-functional compound (F) to give at least one polyether-modified polybutadiene (G).

The at least one hydroxy-functional polybutadiene (E) from step b) serves, in step c), as starter compound for the reaction with the at least one epoxy-functional compound (F). Under ring opening and preferably in the presence of a suitable catalyst, the at least one epoxy-functional compound (F) (also referred to hereinafter simply as "monomer" or "epoxy monomer" or "epoxide") is added onto the OH groups of the at least one hydroxy-functional polybutadiene (E) in a polyaddition reaction. This leads to the formation of the polybutadienes according to the invention with polyether chains in comb (pendant) positions, i.e. to the formation of the at least one polyether-modified polybutadiene (G). The polyether-modified polybutadiene (G) is preferably a linear polybutadiene which has been modified with polyether radicals in comb (pendant) positions. It is thus preferable that the polyether-modified polybutadiene (G) has a linear polybutadiene backbone and pendant polyether radicals.

The reaction in step c) is preferably an alkoxylation reaction, i.e. a polyaddition of alkylene oxides onto the at least one hydroxy-functional polybutadiene (E). However, the reaction in step c) may also be conducted with glycidyl compounds alternatively or additionally to the alkylene oxides.

It is therefore preferable that the at least one epoxy-functional compound used in step c) is selected from the group of the alkylene oxides, preferably from the group of the alkylene oxides having 2 to 18 carbon atoms, further preferably from the group of the alkylene oxides having 2 to 8 carbon atoms, especially preferably from the group consisting of ethylene oxide, propylene oxide, 1-butylene oxide, cis-2-butylene oxide, trans-2-butylene oxide, isobutylene oxide and styrene oxide; and/or in that the at least one epoxy-functional compound used in step c) is selected from the group of the glycidyl compounds, preferably from the group of the monofunctional glycidyl compounds, more preferably from the group consisting of phenyl glycidyl ether, o-cresyl glycidyl ether, tert-butylphenyl glycidyl ether, allyl glycidyl ether, butyl glycidyl ether, 2-ethylhexyl glycidyl ether, C12/C14 fatty alcohol glycidyl ether and C13/C15 fatty alcohol glycidyl ether.

Alternatively or in addition to the above alkylene oxides or glycidyl compounds, it is also possible to use cyclic anhydrides, lactones, dilactides or cyclic carbonates as monomers or comonomers with the alkylene oxides or glycidyl compounds already mentioned.

All cyclic anhydrides known to those skilled in the art, in pure form or in any desired mixtures, may generally be used. The saturated, unsaturated or aromatic cyclic dicarboxylic anhydrides are preferably succinic anhydride, oct(en)yl-, dec(en)yl- and dodec(en)ylsuccinic anhydride, maleic anhydride, itaconic anhydride, glutaric anhydride, adipic anhydride, citraconic anhydride, trimellitic anhydride, phthalic anhydride, hexahydro-, tetrahydro-, dihydro-, methylhexahydro- and methyltetrahydrophthalic anhydride. Particular preference is given to using succinic anhydride, maleic anhydride, phthalic anhydride and hexahydrophthalic anhydride, especially maleic anhydride and phthalic anhydride.

All lactones known to those skilled in the art, in pure form or in any desired mixtures, may generally be used as lactones. Preference may be given to using valerolactones, caprolactones and butyrolactones, all of which may be unsubstituted or substituted by organic radicals, preferably methyl groups. Preference is given to using ε-caprolactone or δ-valerolactone, especially ε-caprolactone.

As cyclic carbonates, it is generally possible to use all cyclic carbonates known to those skilled in the art, accessible via insertion of CO2 into epoxides, in pure form or in any desired mixtures. Preference is given to using propylene carbonate and ethylene carbonate.

The monomers may be added either individually in pure form, in alternating succession in any metering sequence, or else simultaneously in mixed form. The sequence of monomer units in the resulting polyether chain is thus subject to a blockwise distribution or a statistical distribution or a gradient distribution in the end product.

By the process according to the invention, pendant polyether chains are constructed on the polybutadiene, which are exemplified in that they can be prepared in a controlled and reproducible manner in terms of structure and molar mass.

The sequence of monomer units can be varied by the sequence of addition within broad limits.

The molar masses of the pendant polyether radicals may be varied within broad limits by the process according to the invention, and controlled specifically and reproducibly via the molar ratio of the added monomers in relation to the OH groups of the at least one initially charged hydroxy-functional polybutadiene (E) from step b).

The polyether-modified polybutadienes (G) prepared in accordance with the invention are preferably characterized in that they contain B radicals bonded to the polybutadiene skeleton via an ether group according to the formulae (3a), (3b) and (3c)

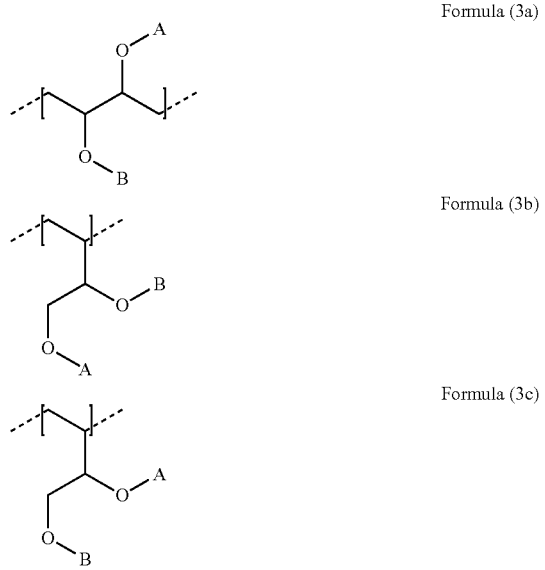

Formula (3a)

Formula (3b)

Formula (3c)

As set out above for b), the A radical in the formulae (3a), (3b) and (3c) comes from the compound A-OH, i.e. the hydroxy-functional compound (D) used in step b). As has also been stated above, two cases are to be distinguished in step b), namely A≠H or A=H. In the first case, i.e. A≠H, the radical A in the formulae (3a), (3b) and (3c) is identical to the radical A in the formulae (2a), (2b) and (2c). In the second case, i.e. A=H, the radical A in the formulae (3a), (3b) and (3c) is in each case independently H or a radical B. If, for example, a monofunctional aliphatic alcohol having 1 to 6 carbon atoms is used as hydroxy-functional compound (D), A is an alkyl radical having 1 to 6 carbon atoms. If, for example, a carboxylic acid is used as hydroxy-functional compound (D), A is an acyl radical. If, however, water is used as hydroxy-functional compound (D), A in the formulae (3a), (3b) and (3c) is a B radical in the case of reaction with one or more epoxy-functional compounds (F); A remains hydrogen in the case that there is no reaction. Therefore, each pendant hydroxyl group converted results in exactly one pendant —O—B radical. The radical B is in turn composed of one or more monomers, preferably of two or more monomers, of the at least one epoxy-functional compound (F) used.

In the context of the invention, it is possible in principle to use all alkoxylation catalysts known to the person skilled in the art, for example basic catalysts such as alkali metal hydroxides, alkali metal alkoxides, amines, guanidines, amidines, phosphorus compounds such as triphenylphosphine, and additionally acidic and Lewis-acidic catalysts such as $SnCl_4$, $SnCl_2$, $SnF_2$, $BF_3$ and $BF_3$ complexes, and also double metal cyanide (DMC) catalysts.

Prior to the feeding of epoxide, i.e. prior to the addition of the at least one epoxy-functional compound (F) used, the reactor partly filled with the starter and catalyst is inertized, for example with nitrogen. This is accomplished, for example, by repeated alternating evacuation and supply of nitrogen. It is advantageous to evacuate the reactor to below 200 mbar after the last injection of nitrogen. This means that the addition of the first amount of epoxy monomer preferably takes place into the evacuated reactor. The monomers are dosed while stirring and optionally cooling in order to remove the heat of reaction released and to maintain the preselected reaction temperature. The starter used is the at least one hydroxy-functional polybutadiene (E), or else it is possible to use a polyether-modified polybutadiene (G) already prepared by the process of the invention as starter, as described further down.

A second subject matter of the invention is the use of the adhesion promoter for preparing an adhesion promoter composition. The adhesion promoter composition preferably has further additives or solvent. These are known to those skilled in the art and can be used.

A third subject matter of the invention is the use of the adhesion promoter or the adhesion promoter composition according to the invention for producing coating materials, such as dispersions, millbases, paints, coatings or printing inks, inkjet, grind resins, pigment concentrates, colour preparations, pigment preparations, filler preparations or coating compositions, sealant and adhesive compositions.

Preference is given to using 0.1 to 50% by weight, preferably 0.1-10% by weight, more preferably 0.5-5% by weight of the adhesion promoter, based on the total composition in accordance with the respective application, for example coating materials, sealant or adhesive compositions.

A fourth subject matter of the invention is a process comprising the application of a curable film-forming composition comprising the adhesion promoter or the adhesion promoter composition according to the invention.

The substrate is preferably metal, concrete, wood and/or a composite material such as glass fibre and/or carbon fibre composite, steel (variously alloyed and/or post-treated), aluminium, mineral substrates such as glass, dimensionally stable plastics and/or duromers.

The adhesion promoters or adhesion promoter compositions according to the invention may preferably be used in 1K (one-component) coating systems or 2K (two-component) coating systems, in melamine baking systems, or room or high-temperature systems, UV systems.

The term "metallic substrates" is understood to mean, albeit non-exhaustively, the following materials: hot and cold rolled steel, with or without post-treatment. Steels that are not post-treated are degreased prior to use by means of specific cleaners, for example, from GARDOBOND®.

As first layer, a chemical solution may be applied, for example Type 26 from GARDOBOND®. This can be either sprayed (S) or dipped (D). The post-treatment may typically be carried out using an inorganic conversion layer based on phosphation, alkaline passivation or chromation. This may be carried out by hot dip galvanization or else electrolytic galvanization. For example, an aqueous zinc phosphate solution may be used. This forms a layer of tertiary zinc phosphate or zinc-iron phosphate.

However, phosphation may also be carried out. For example, an aqueous solution with primary alkali metal phosphates is used. These sheet metals may be obtained, for example, from Q-LAB® as Type R-I.

Subsequently, to ensure a sealed protective layer on the metal, a further chemical rinse solution for passivation is used. Typically used is, firstly, demnineralized water or else diverse rinse solutions, for example Gardolene® D60, D86 or D6800.

Aluminium is usually used cold-rolled, corresponding to the grade AlMg 1 G 18, for example type AA 5005A from GARDOBOND® or the grade AlMg0.4Si1.2 (automobile specification) type AA6016 from GARDOBOND®. Here, the surface is treated with an aqueous chromating solution comprising chromic acid. These sheet metals are, inter alia, obtainable from Q-LAB® as type AL. However, galvanized steel may also be further treated using this method.

The term "glass" is understood to mean inorganic silicate glasses, for example borosilicate glass or soda-lime glass, which serve, for example, as beverage bottles. These are typically provided with labels or else recently also by direct printing.

The term "dimensionally stable polymers" is understood to mean, albeit non-conclusively, the following polymers: acrylonitrile-butadiene-styrene (ABS), polyamides (PA), polymethylmethacrylate (PMMA), polycarbonate (PC), polyethylene terephthalate (PET), polyethylene (PE), polypropylene (PP), polystyrene (PS), polyetheretherketone (PEEK), polyvinylchloride (PVC). Polypropylene (PP), polyethylene (PE), synthetic rubber mixtures of ethylene propylene diene (EPDM).

In the 1K coating systems, the film-forming polymer on the one hand preferably does not comprise any functional groups since the film formation is due to physical drying, or else double bonds if the drying takes place due to a mixture of oxidative curing and physical drying.

The film-forming polymer, which dries purely physically, is preferably selected from the group of the acrylate polymers, for example of the trade name Degalan from EVONIK®. If a polymer which also cures oxidatively is preferred, it is typically selected from the group of alkyd binders. These belong chemically to the polyesters and are formed by condensation of alcohols and multiprotic acids with addition of fatty acids to modify the properties. These are differentiated according to the level of oil content, which controls the drying characteristics. In the case of an oil content below 40%, this is referred to as a short oil alkyd which air dries. At an oil content between 40 and 60%, this is referred to as a medium oil alkyd resin which is oven dried. At an oil content over 60%, a non-drying alkyd is obtained.

Preferably used in the formulation according to the invention is a short oil air drying alkyl resin, for example from WORLEEKyd®. The polymerization takes place via the double bonds of the unsaturated fatty acid esters under the influence of oxygen. Particularly noteworthy here is polyunsaturated α-linolenic acid. Siccatives are typically used to accelerate the curing. These preferably take the form of octoates. For example, cobalt octoates or calcium octoates. Used in the formulation according to the invention is an Octa-Soligen® Cobalt 6 and an Octa-Soligen® Calcium 10 in combination with a novel siccative Borchi® OXY-Coat from BORCHERS®. Also conceivable are cobalt octoates with the trade names Octa-Soligen® Cobalt 10 or Octa-Soligen® Cobalt 12. In addition, also manganese octoates under the trade name Octa-Soligen® Manganese 10 or else zirconium octoates under the trade name Octa-Soligen® Zirconium 18 from BORCHERS®. Manganese octoate (AKDRY Mn Octoate 6%) and zirconium octoate are also obtainable from AMERICAN ELEMENTS®. Calcium octoates are also obtainable from PATCHEM® LTD under the trade name Calcium Octoate 10%. Furthermore, it is also possible to use siccatives based on barium, cerium, lithium or strontium. Nowadays, modern drying substances based on metal soaps of various carboxylic acids are available. An example, based on 2-ethylhexanoic acid, is from BORCHERS® under the trade name Octa-Soligen® 203.

If the drying should proceed too quickly, so-called antiskinning agents based on, for example, ketoximes, substituted phenols or aldoximes, are added. These form reversible complexes with siccatives. Oximes are available, for example, from BODO MÖLLER® CHEMIE under the trade names Dura® MEKO or Duroxim P or butanone oxime is available from FISHER SCIENTIFIC® under the trade name Alfa Aesar® 2.

However, dilution with a suitable solvent is always necessary to ensure good processability. Xylene is preferably used in the formulation according to the invention. Also conceivable is the use of aliphatic hydrocarbons.

In the case of 2K coating systems, the film-forming polymer preferably comprises functional groups reactive with an isocyanate-containing curing agent, an amine-containing curing agent or with a catalyst.

The film-forming polymer is preferably selected from the group of hydroxyl-functional acrylate polymers, polyester polymers, polyurethane polymers and/or polyether polymers, polyoxypropyleneamines, amino-functional acrylate polymers or polyester polymers and polycarbamates reactive with an isocyanate-containing curing agent.

Such polymers typically have reactive hydroxyl groups. It is particularly preferable to employ polymers having a plurality of hydroxyl-functional groups. Hydroxyl-functional acrylates are obtainable, inter alia, from Allnex® under the trade names MACRYNAL® or SETALUX®. Examples of hydroxyl-functional polyesters are, inter alia, commercially available under the trade name DESMOPHEN® or SETAL®. Usable and commercially available hydroxyl-functional polyethers are obtainable, inter alia, under the trade name TERATHANE® or POLYMEG®.

Preferably, the tested 2K coating according to the invention includes a curing agent selected from the group of the aliphatic or cycloaliphatic isocyanates.

Examples of isocyanate-containing curing agents are monomeric isocyanates, polymeric isocyanates and isocyanate prepolymers. Polyisocyanates are preferred over monomeric isocyanates on account of their lower toxicity. Examples of polyisocyanates are isocyanurates, uretdiones and biurets based on diphenylmethane diisocyanate (MDI), toluene diisocyanate (TDI), hexamethylene diisocyanates (HDI) and isophorone diisocyanate (IPDI). Examples of commercially available products are those under trade name DESMODUR® from Covestro or VESTANAT from Evonik Industries. Known products are DESMODUR® N3200, DESMODUR® N3300, DESMODUR® N3600 DESMODUR® N75, DESMODUR® XP2580, DESMODUR® Z4470, DESMODUR® XP2565 and DESMODUR® VL from Covestro. Further examples are VESTANAT® HAT 2500 LV, VESTANAT® HB 2640 LV or VESTANAT® T 1890E from Evonik Industries. Examples of isocyanate prepolymers are DESMODUR® E XP 2863. DESMODUR® XP 2599 or DESMODUR® XP 2406 from Covestro. Further isocyanate prepolymers known to those skilled in the art may be used.

It is conceivable to use catalysts for curing. The catalysts that follow, selected from organic Sn(IV), Sn(II), Zn, Bi compounds or tertiary amines, may be used.

Preference is given to using catalysts selected from the group of organotin catalysts, titanates or zirconates, organometallic compounds of aluminium, iron, calcium, magnesium, zinc or bismuth, Lewis acids or organic acids/bases, linear or cyclic amidines, guanidines or amines or a mixture thereof.

Curing catalysts used are preferably organic tin compounds, for example dibutyltin diacetylacetonate, dibutyltin diacetate, dibutyltin dioctoate, or dioctyltin dilaurate, dioctyltin diacetylacetonate, dioctyltin diketanoate, dioctylstannoxane, dioctyltin oxide, preferably dioctyltin diacetylacetonate, dioctyltin dilaurate, dioctyltin diketanoate, dioctylstannoxane, dioctyltin dicarboxylate, dioctyltin oxide, particularly preferably dioctyltin dicarboxylate and dioctyltin dilaurate. In addition, it is also possible to use zinc salts such as zinc octoate, zinc acetylacetonate and zinc 2-ethylcaproate, or tetraalkylammonium compounds such as N,N,N-trimethyl-N-2-hydroxypropylammonium hydroxide, N,N,N-trimethyl-N-2-hydroxypropylammonium 2-ethylhexanoate or choline 2-ethylhexanoate. Preference is given to the use of zinc octoate (zinc 2-ethylhexanoate) and of the tetraalkylammonium compounds, particular preference being given to zinc octoate. Further preferred are bismuth catalysts, e.g. TIB Kat (TIB Mannheim) or Borchi® catalysts, titanates, e.g. titanium(IV) isopropoxide, iron(III) compounds, e.g. iron(III) acetylacetonate, aluminium compounds, such as aluminium triisopropoxide, aluminium tri-sec-butoxide and other alkoxides and also aluminium acetylacetonate, calcium compounds, such as calcium disodium ethylenediaminetetraacetate or calcium diacetylacetonate, or else amines, examples being triethylamine, tributylamine, 1,4-diazabicyclo[2.2.2]octane, 1,8-diazabicyclo[5.4.0]undec-7-ene, 1,5 diazabicyclo[4.3.0]non-5-ene, N,N-bis(N,N-dimethyl-2-aminoethyl)methylamine, N,N-dimethylcyclohexylamine, N,N dimethylphenylamine, N-ethylmorpholine, etc. Also preferred as catalysts are organic or inorganic Brønsted acids such as acetic acid, trifluoroacetic acid, methanesulfonic acid, p-toluenesulfonic acid or benzoyl chloride, hydrochloric acid, phosphoric acid and the monoesters and/or diesters thereof, for example butyl phosphate, (iso)propyl phosphate, dibutyl phosphate, etc. Also preferred are guanidine group-bearing organic and organosilicon compounds. It is of course also possible to use combinations of two or more catalysts. In addition, it is also possible to use photolatent bases as catalysts, as described in WO 2005/100482.

The curing catalyst is preferably used in amounts of 0.01% to 5.0% by weight, more preferably 0.05% to 4.0% by weight and especially preferably 0.1% to 3% by weight, based on the total mass of the curable composition.

Employment of solvents may also be useful. These solvents may serve, for example, to lower the viscosity of the uncrosslinked binder, or may facilitate application onto the surface. Solvents contemplated include in principle all solvents and also solvent mixtures. The choice of a suitable solvent may be made from the group of the alkanes, alkenes, alkynes, benzene and aromatics with aliphatic and aromatic substituents, carboxylic esters, linear and cyclic ethers and, at high pressures, carbon dioxide as well, halogenated aliphatic or aromatic hydrocarbons, ketones or aldehydes, lactones (γ-butyrolactone), lactams (e.g. N-methyl-2-pyrrolidone), nitriles, nitro compounds, tertiary carboxamides (dimethylformamide), urea derivatives such as tetramethylurea or dimethylpropyleneurea (DMPU), sulfoxides such as dimethyl sulfoxide (DMSO), sulfones such as sulfolane, carbonic esters such as dimethyl carbonate or ethylene carbonate. Mention may also be made of protic solvents such as water, methanol, ethanol, n- and isopropanol and other alcohols, primary and secondary amines, carboxylic acids and esters thereof, and also anhydrides, primary and secondary amides such as formamide. Preference is given to solvents accepted in coating applications such as ethers, e.g. t-butyl methyl ether, esters, for example ethyl acetate or n-butyl acetate, tert-butyl acetate or diethyl carbonate, and alcohols, for example ethanol and the various regioisomers of propanol and butanol. Preferred solvents also include aromatic and/or aliphatic solvents such as benzene, toluene or naphtha cuts.

It is also possible to add, if required, one or more substances selected from the group comprising co-crosslinkers, flame retardants, deaerating agents, curing agents, antimicrobial and preservative substances, dyes, colourants and pigments, anti-freeze agents, fungicides, spraying assistants, wetting agents, fragrances, light stabilizers, free-radical scavengers, UV absorbers and stabilizers, especially stabilizers to counter thermal and/or chemical stress and/or stress caused by ultraviolet and visible light.

UV stabilizers are preferably known products based on hindered phenolic systems or benzotriazoles. Light stabilizers used may be, for example, those known as HALS amines. Employable stabilizers include for example the products or product combinations known to those skilled in the art comprising for example Tinuvin® stabilizers (BASF), for example Tinuvin® stabilizers (BASF), for example Tinuvin® 1130, Tinuvin® 292 or else Tinuvin® 400, preferably Tinuvin® 1130 in combination with Tinuvin® 292. The amount in which they are used is determined by the degree of stabilization required.

Suitable for colouring in coatings are pigments based on titanium dioxide and other white pigments, inorganic colour pigments such as iron oxides, chromium pigments, ultramarine pigments, organic colour pigments such as azo pigments, phthalocyanine pigments, perylene pigments, quinacridone pigments, also carbon blacks. To improve corrosion protection typical anticorrosion pigments such as zinc phosphate are also used.

Fillers are preferably precipitated or ground chalk, inorganic carbonates in general, precipitated or ground silicates, precipitated or fumed silicas, glass powders, hollow glass beads (called bubbles), metal oxides, such as $TiO_2$, $Al_2O_3$, natural or precipitated barium sulphates, finely ground quartzes, sand, aluminium trihydrates, talc, mica, cristobalite flours, reinforcing fibres, such as glass fibres or carbon fibres, long-fibre or short-fibre wollastonites, cork, carbon black or graphite. Hydrophobized fillers may be advantageously employed, since these products have a lower water ingress and improve the storage stability of the formulations.

It is also conceivable to use the adhesion promoter and adhesion promoter composition according to the invention in UV curing formulations. Here, curing takes place by free radical polymerization.

The film-forming polymers are preferably selected from the group of acrylates and methacrylates. In most cases, a mixture of, for example a polyether acrylate from BASF with the trade name Laromer LR 8945® and a polyester acrylate from BASF® with the trade name Laromer LR8799 or Laromer LR8800 is used.

Suitable as reactive solvent are hexadiol diacrylate or trimethylolpropane triacrylate.

The examples which follow are provided merely to elucidate this invention to those skilled in the art and do not constitute any limitation of the described subject matter or of the described process whatsoever.

I. PREPARATION EXAMPLES

General Methods

Gel Permeation Chromatography (GPC)

GPC measurements for determination of polydispersity ($M_w/M_n$), weight-average molar mass ($M_w$) and number-average molar mass ($M_n$) were conducted under the following measurement conditions: SDV 1000/10 000 Å column combination (length 65 cm), temperature 30° C., THF as mobile phase, flow rate 1 ml/min, sample concentration 10 g/l, RI detector, evaluation against polypropylene glycol standard.

Determination of the Content of Epoxy Groups in the Polybutadiene (Epoxy Content, Epoxidation Level)

The content of epoxy groups was determined with the aid of $^{13}$C-NMR spectroscopy. A Bruker Avance 400 NMR spectrometer was used. The samples were for this purpose dissolved in deuterochloroform. The epoxy content is defined as the proportion of epoxidized butadiene units in mol % based on the entirety of all repeat units present in the sample. This corresponds to the number of epoxy groups in the epoxidized polybutadiene divided by the number of double bonds in the polybutadiene used.

Determination of the Acid Value

The acid value was determined by a titration method in accordance with DIN EN ISO 2114.

Preparation of the Adhesion Promoter According to the Invention

Based on the as yet unpublished European patent application EP 19212066.5 or PCT/EP2020/083013 1.1, the steps a)-c) were carried out. As an example, the first example in each case is described with regard to the weight of the component. The weights used and parameters of the intermediate products and end products can be found in the respective tables.

Step a) Preparation of Epoxidized Polybutadienes

A polybutadiene of the brand name Polyvest® 110 (Evonik) having the structure x=1%, y=24% and z=75% was used to prepare an epoxidized polybutadiene.

Generic Illustration for Example A1

A 5 L multi-necked flask was initially charged with 1500 g of Polyvest® 110 and 81.0 g of conc. formic acid in 1500 g of chloroform at room temperature under a nitrogen atmosphere. Subsequently, 300 g of 30% $H_2O_2$ solution (30% by weight $H_2O_2$ based on the total mass of the aqueous solution) was slowly added dropwise and then the solution was heated to 50° C. for 5.5 hours. After the reaction had ended, the mixture was cooled to room temperature, the organic phase was removed and washed four times with dist. $H_2O$. Excess chloroform and residual water were distilled off. 1440 g of the product were obtained, which was admixed with 1000 ppm of Irganox® 1135 and stored under nitrogen.

Evaluation by means of $^{13}$C NMR gave an epoxidation level of about 8.5% of the double bonds.

$M_w$=4597 g/mol; $M_n$=1999 g/mol; $M_w/M_n$=2.3

For the other Examples A2-A4, the weights, reaction conditions and evaluations can be found in Table 1. To make it easier to read, the designation of Examples A1-A4 has been retained for Table 2.

TABLE 1

| | Epoxidized polybutadiene | | | | | | | | | |
|---|---|---|---|---|---|---|---|---|---|---|
| | Polybutadiene [g] | Conc. formic acid [g] | CHCl$_3$ [g] | 30% H$_2$O$_2$ sol. [g] | t [h] | $M_n$ [g/mol] | $M_w$ [g/mol] | $M_w/M_n$ | Degree of epoxidation [%] | Yield [g] |
| A1 | 1500 | 81.0 | 1500 | 300 | 5.5 | 1999 | 4597 | 2.3 | 8.5 | 1440 |
| A2 | 1500 | 81.0 | 1500 | 300 | 7 | 2001 | 4620 | 2.4 | 8.5 | 1425 |
| A3 | 800 | 43.2 | 800 | 160 | 9.5 | 1992 | 4582 | 2.3 | 3.3 | 767 |
| A4 | 800 | 43.2 | 800 | 160 | 10 | 2011 | 4625 | 2.3 | 8.4 | 756 |

Step b) Preparation of Hydroxy-Functional Polybutadienes

The epoxidized polybutadiene A1 from step a) was used to prepare a hydroxylated polybutadiene. The degree of hydroxylation here is the number of OH groups of the hydroxy-functional polybutadiene divided by the number of double bonds in the polybutadiene used in step a). For the preparation, a 5 L four-necked flask under a nitrogen atmosphere was initially charged with 1400 g of the epoxidized polybutadiene in 1400 g of isobutanol and 80 ppmw of trifluoromethanesulfonic acid (based on mass of epoxidized polybutadiene) with stirring. This was followed by heating to 70° C. and stirring of the mixture at this temperature for 6 hours. The reaction mixture became clear during the reaction. After the reaction had ended, the mixture was cooled to room temperature and the solution was neutralized by adding 21.4 g of sat. NaHCO$_3$ solution. The mixture was heated to 115° C. and excess water and excess alcohol was distilled off under reduced pressure. The alcohol recovered by distillation and optionally dried may be reused in subsequent syntheses. The isobutanol distilled off may be dried, for example, by distillation or by addition of drying agents such as molecular sieves. 1455 g of a brownish product were obtained, which was admixed with 1000 ppm of Irganox® 1135 and stored under nitrogen.

Evaluation by means of $^{13}$C-NMR showed complete conversion of all epoxy groups, which gives a degree of hydroxylation of ca. 8.5%.

$M_w$=6228 g/mol; $M_n$=2196 g/mol; $M_w/M_n$=2.8

The step was also carried out analogously for the other examples; see Table 2.

TABLE 2

| | Hydroxy-functional polybutadiene | | | | | | | |
|---|---|---|---|---|---|---|---|---|
| | Epoxidized polybutadiene from Table 1 [g] | isobutanol [g] | sat. NaHCO$_3$ sol. [g] | t[h] | $M_n$ [g/mol] | $M_w$ [g/mol] | $M_w/M_n$ | Degree of Hydroxylation [%] | Yield [g] |
| A1 | 1400 | 1400 | 21.4 | 6 | 2196 | 6228 | 2.8 | 8.5 | 1455 |
| A2 | 1400 | 1400 | 21.4 | 4.5 | 2203 | 6080 | 2.8 | 8.5 | 1467 |
| A3 | 720 | 720 | 11.0 | 5 | 2325 | 7551 | 3.2 | 8.3 | 752 |
| A4 | 700 | 700 | 10.7 | 6 | 2313 | 7898 | 3.4 | 8.4 | 726 |

Step c) Preparation of the Adhesion Promoter According to the Invention by Alkoxylation of the Hydroxy-Functional Polybutadiene A 3 litre autoclave was initially charged with 334.0 g of the hydroxy-functional polybutadiene A1 from step b) and 19.2 g of 30% sodium methoxide solution (30% by weight sodium methoxide in methanol based on total mass of the solution) under nitrogen, and the mixture was stirred at 50° C. for 1 hour. Subsequently, the mixture was heated up to 115° C. while stirring and the reactor was evacuated down to an internal pressure of 30 mbar in order to distillatively remove excess methanol and other volatile ingredients present. A mixture of 462 g of ethylene (EO) oxide and 351 g of propylene oxide (PO) were metered in continuously and with cooling over 9 hours at 115° C. and max. internal reactor pressure 3.5 bar (absolute). The 30-minute after-reaction at 115° C. was followed by degassing. Volatile components such as residual ethylene oxide and propylene oxide were distilled off under reduced pressure. The product was cooled to 95° C., neutralized with 30% H$_3$PO$_4$ to an acid number of 0.1 mg KOH/g, and admixed with 1000 ppm of Irganox® 1135. Water was removed by distillation under reduced pressure and precipitated salts were filtered off. 1076 g of the medium-viscous and orange coloured, clear alkoxylated polybutadiene were isolated and stored under nitrogen.

$M_w$=13481 g/mol; $M_n$=3209 g/mol; $M_w/M_n$=4.2

Further adhesion promoters according to the invention and comparative example were carried out analogously with the weights and reaction conditions listed according to Table 3. The alkoxylation modifications are evident from the "feed profile" column.

TABLE 3

Inventive adhesion promoter and comparative example

| Adhesion promoter | Hydroxy-functional polybutadiene [g] from Table 2 | Feed profile | t [h] | Cat. [g] | $M_n$ [g/mol] | $M_w$ [g/mol] | $M_w/M_n$ | AN [mg KOH/g] | Yield [g] | Physical state |
|---|---|---|---|---|---|---|---|---|---|---|
| HA1 | 532 of A1 | 586 g PO | 8 | 30.3 | 3233 | 13650 | 4.5 | 0.1 | 1062 | liquid |
| HA2 | 555 of A2 | 232 g EO/306 g PO | 6.5 | 31.6 | 3209 | 13431 | 4.2 | 0.1 | 1013 | liquid |
| HA3 | 627 of A3 | 520 g PO/920 g EO | 10 | 35.8 | 4373 | 18940 | 4.3 | 0.1 | 7269 | liquid |
| HA4 | 303 of A4 | 835 g PO | 9 | 17.3 | 2999 | 20638 | 6.88 | 0.1 | 1052 | liquid |
| VGA2 | 596 of A2 | 498 g EO | 3.5 | 33.9 | 3025 | 10130 | 3.4 | 0.1 | 1030 | solid |

II. Application Examples

General Conditions

Where values are expressed in % in the context of the present invention, these are in % by weight unless otherwise stated. In the case of compositions the values reported in % are based on the entire composition unless otherwise stated. Where reference is hereinbelow made to averages these are number averages unless otherwise stated. Where reference is hereinbelow made to measured values these measured values were determined at a pressure of 101 325 Pa, a temperature of 23° C. and ambient relative humidity of approx. 40% unless otherwise stated.

Instruments

Speedmixer, from Hauschild Engineering, model FAC 150.1 FVZ
Drying oven, from Binder, instrument type FDL 115 E2
Dispermat, from Getzmann, instrument type CV2-SIP
Cross-cut tester, DIN EN ISO 2409, CCP cross-cut stencil set
Cutter knife, from HEYCO Model 01664000000
Adhesive tape, from TESA 4651
Laboratory balance, Sartorius MSE 6202 S 100 DO
Spiral coating bar, from BYK Gardner, 100 μm

Methods

Adhesion Test

For optimal testing of adhesive performance of adhesion promoters, an initial preliminary test by means of the Andreas cut test has proven to be useful. If a sample is evaluated with a 1 (no flaking), the cross-cut test in accordance with DIN EN ISO 2409 then follows. In this way, time and effort are minimized. It is sometimes also sufficient to use only the value of the Andreas cut test.

a) Preliminary Test Using the Andreas Cut Test

Using a cutter knife, two scores are cut through into the coating, at 90° to each other along a ruler and of a respective length of 3 to 4 cm, penetrating as far as the substrate. In the case of plastic substrates, care should be taken as much as possible not to cut the substrate. Subsequently, the scored area is masked with a TESA adhesive tape 4651, pressed firmly and then peeled off. Evaluation is shown in the FIGURE.

b) Cross-Cut Test is Carried Out in Accordance with DIN EN ISO 2409

Compatibility testing is determined by a visual evaluation of the coating film by means of the scale (Table 4).

TABLE 4

Scale of the visual assessment of the coating film:

| | Appearance/Features |
|---|---|
| 1 | clear |
| 2 | Slightly cloudy |
| 3 | Slightly cloudy and/or specks |
| 4 | Cloudy, specks and/or pinholes |
| 5 | Very cloudy and/or craters, specks, pinholes, wetting defects |

Materials

TABLE 5

Raw materials for the coating formulations

| Trade name | Chemical description | Intended use | Company |
|---|---|---|---|
| Macrynal ® SM 510/60 LG | Hydroxy-functional polyacrylate | Film-forming polymer | Allnes |
| Setal ® 1603 | Hydroxyl-containing polyester | Film-forming polymer | Allnex |
| Desmodur ® N 3200 | Polyisocyanate | Curing agent | Covestro |
| Desmodur ® N 3600 | Polyisocyanate | Curing agent | Covestro |
| Butyl acetate | Butyl acetate | Solvent | Sigma-Aldrich |
| Butyldiglycol acetate | Butyldiglycol acetate | Solvent | |
| Solvesso 100 | Aromatic hydrocarbon in the distillation range of 166° C.-181° C. | Solvent | Brenntag |
| Hydrosol A 170 | Aromatic hydrocarbon | Solvent | DHC Solvent Chemie GmbH |
| Xylene | Isomeric mixture of aromatic hydrocarbons | Solvent | Sigma-Aldrich |
| Methoxypropyl acetate | Carboxylic esters | Solvent | Sigma-Aldrich |
| TIB KAT ® 318 | Dioctyltin dicarboxylate | Catalyst | TIB Chemicals AG |
| TIB KAT ® 218 | Dibutyltin dilaurate | Catalyst | TIB Chemicals AG |
| TEGO ® Flow 300 | Acrylate-containing polymer | Levelling additive | Evonik |
| TEGO ® Airex 990 | Defoamer/deaerater | Defoamer/deaerater | Evonik |

Preparation of the Coating Formulations

For the application tests, initially two coating formulations E1 and E2 were prepared corresponding to the constituents and quantities of Table 6.

Coating Formulation E1

The constituents (P1+P5 to P7, P10+P11 and P13+P14), without curing agent (P4), with the amounts listed in Table 6, were extrapolated to 2 kg. Firstly, P1 was weighed into a sheet metal can having a 2.5 L volume capacity. The positions P5 to P7 and P10 to P13 were added successively with stirring. The mixture was prepared using a Dispermat from Getzmann, instrument type CV2-SIP, with a dispersion disc having a diameter of 8 cm and at a speed of 500 rpm and, after addition of the last position, stirred for a further 20 minutes. Care was taken to ensure that no smears were to be seen.

Coating Formulation E2

For the coating formulation E2, all constituents (P2+P6, P8+P9 and P12+P14) except the curing agent (P3) were extrapolated to 2 kg using the amounts listed in Table 3 and weighed into a sheet metal can having a 2.5 L volume capacity. The mixture was stirred using a Dispermat from Getzmann, instrument type CV2-SIP, with a dispersion disc having a diameter of 8 cm and at a speed of 500 rpm. Firstly, the binder (P2) is initially charged, all other constituents (P6+P8+P9+P12+P14) being added with stirring. After addition of the last position, the mixture was stirred for a further 20 minutes.

1) Preparation of the Coating Formulations for the Application Tests

The inventive compounds HA1-HA4, comparative examples VGA2 and PV 110 (Polyvest® 110) were each added to 5% by weight based on the respective solids content (E1=57.5% by weight; E2=56.3% by weight). The coating formulations E1 or E2 without addition of adhesion promoter served as a blank reference.

To incorporate the inventive adhesion promoters HA1-HA4, comparative examples VGA2 and PV 110, in each case 20 g of the coating formulations E1 and E2 (in the 2K systems including curing agent) were weighed into a 50 ml PP screw-top jar (Dürrmann GmbH & Co KG, 85664 Hohenlinden) and mixed for two minutes at 2000 revolutions per minute using a speed mixer (Hauschild Engineering, Type DAC 150 FVZ). The prepared coating formulations were then applied to various substrates using a 100 µm spiral coating bar so as to achieve a dry layer thickness of ca. 40 µm in the dried state. E1 was applied in each case to glass, Metzler acrylonitrile-butadiene-styrene (ABS) and aluminium A36 Q-Panel. E2 was applied to steel A36 Q panels. The applied substrates were dried and cured at room temperature (23° C.) overnight and then at 60° C. for 2 days.

TABLE 6

Composition of 100 g of each of the coating formulations

| Position P | Raw materials [g] | E1 | E2 |
|---|---|---|---|
| 1 | Macrynal ® SM 510/60 LG | 60.1 | |
| 2 | Setal ® 1603 | | 55.7 |
| 3 | Desmodur ® N 3600 | | 30.6 |
| 4 | Desmodur ® N 3200 | 21.3 | |
| 5 | Methoxypropyl acetate | 4.6 | |
| 6 | Butyl acetate | 5.5 | 11.1 |
| 7 | Solvesso 100 | 3.4 | |
| 8 | Hydrosol A 170 | | 1.1 |
| 9 | Butyldiglycol acetate | | 1.1 |
| 10 | Xylene | 4.2 | |
| 11 | TIB KAT ® 318 | 0.3 | |
| 12 | TIB KAT ® 218 | | 0.3 |
| 13 | TEGO ® Flow 300 | 0.5 | |
| 14 | TEGO ® Airex 990 | 0.1 | 0.1 |

The results are shown in the following tables.

TABLE 7

Coating formulation E1 on glass

| Examples | Chemical modification EO/PO (Mass) | Adhesion Andreas Cut/Cross-cut | Compatibility |
|---|---|---|---|
| E1 | | 6 | 1 |
| PV 110 | | 6 | 4 |
| VGA2 | 498 g/0 | 6 | 1 |
| HA2 | 332 g/306 g | 2 | 1 |
| HA3 | 520 g/920 g | 2 | 1 |

The coating formulation E1 as blank reference showed no adhesion to glass as expected, likewise both comparative examples PV 110 and VGA2. In addition, the coating film in PV 110 was cloudy and had specks and/or pinholes.

The coating formulations with the adhesion promoters HA2 and HA3 according to the invention showed good adhesion to glass with very good compatibility. Since the Andreas cut text had "only" a 2, the cross-cut test was omitted. Surprisingly, it was found that the adhesive effect could be significantly improved by the alkoxylation with additionally at least one PO unit.

TABLE 8

Coating formulation E1 on ABS

| Products | Chemical modification EO/PO (Mass) | Adhesion Andreas Cut/Cross-cut | Compatibility |
|---|---|---|---|
| E1 | | 6 | 1 |
| PV 110 | | 6 | 4 |
| VGA2 | 498 g/0 | 6 | 1 |
| HA2 | 332 g/306 g | 4 | 1 |
| HA3 | 520 g/920 g | 4 | 1 |

A similar evaluation image on ABS resulted as in the case of glass.

TABLE 3

Coating formulation E1 on Aluminium A36 Q-Panel:

| Products | Chemical modification EO/PO (Mass) | Adhesion Andreas Cut/Cross-cut | Compatibility |
|---|---|---|---|
| E2 | | 6 | 1 |
| PV 110 | | 5 | 4 |
| HA1 | 0/586 g | 5 | 2 |
| HA2 | 332 g/306 g | 3 | 1 |

The coating formulations with the adhesion promoters according to the invention on an aluminium substrate were significantly better than that of the comparative example in at least one property, particularly in the compatibility.

TABLE 10

Coating formulation E2 on Steel S36 Q-Panel

| Products | Chemical modification EO/PO (Mass) | Adhesion Andreas Cut/Cross-cut | Compatibility |
|---|---|---|---|
| E3 | | 5 | 1 |
| PV 110 | | 5 | 5 |
| HA1 | 0/586 g | 3 | 3 |
| HA4 | 0/835 g | 1/GT3 | 4 |

The coating formulations E2 with the adhesion promoters according to the invention showed a distinct improvement in adhesion and compatibility.

The examples showed quite unexpectedly the universal application of the adhesion promoters according to the invention.

The invention claimed is:

1. A universal adhesion promoter, comprising:
a compound based on a polybutadiene having at least one repeat unit selected from the group consisting of divalent radicals
wherein

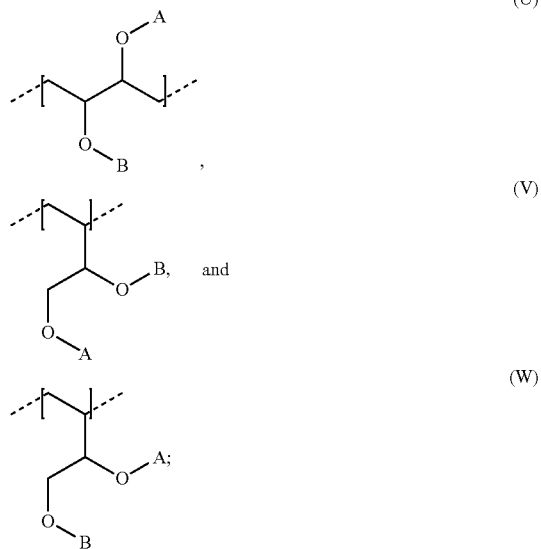

A is in each case independently a monovalent organic radical or a hydrogen radical;
B is in each case independently a radical of the formula (4a)

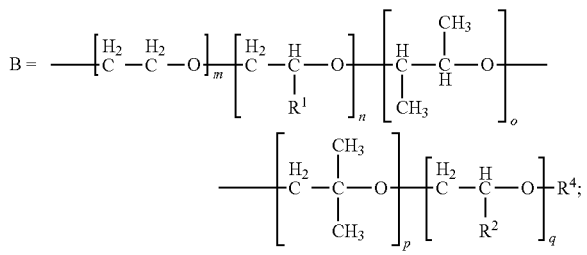

$R^1$ is in each case independently a monovalent hydrocarbon radical having 1 to 16 carbon atoms;
$R^2$ is a radical of the formula $-CH_2-O-R^3$;
$R^3$ is in each case independently a monovalent hydrocarbon radicals having 3 to 18 carbon atoms;
$R^4$ is in each case independently a monovalent organic radical having 1 to 18 carbon atoms or hydrogen;
m, n, o, p and q are each independently 0 to 300, with the proviso that a sum total of m, n, o, p and q is greater than 1; and wherein B has at least one repeat unit in accordance with

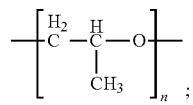

including every permutation of repeat units in B.

2. The adhesion promoter according to claim 1, wherein m, n, o, p and q are each independently 0 to 100, with the proviso that the sum total of m, n, o, p and q is greater than 1.

3. The adhesion promoter according to claim 1, wherein a number-average molar mass $M_n$ of the polybutadiene is from 200 g/mol to 20,000 g/mol.

4. The adhesion promoter according to claim 1, wherein the polybutadiene has 0% to 80% of double bonds present as 1,2 vinyl double bonds, and 20% to 100% of the double bonds present as 1,4 double bonds.

5. The adhesion promoter according to claim 1, wherein an average molar mass of B is from 100 g/mol to 10,000 g/mol.

6. The adhesion promoter according to claim 1, wherein the compound is based on linear polybutadienes.

7. The adhesion promoter according to claim 1, wherein the compound has no pendant (in comb position) polybutadienes.

8. The adhesion promoter according to claim 1, wherein the compound has exclusively pendant (in comb position) repeat units (U), (V), and/or (W).

9. A method for preparing an adhesion promoter composition, the method comprising:
mixing the adhesion promoter according to claim 1 into a composition.

10. A composition comprising the adhesion promoter according to claim 1, wherein the composition is one selected from the group consisting of a coating material, a dispersion, a millbase, a paint, a coating or printing ink, an inkjet, a grind resin, a pigment concentrate, a colour preparation, a pigment preparation, a filler preparation composition, a coating composition, a sealant composition, and an adhesive composition.

11. A process, comprising:
applying a curable film-forming composition comprising the adhesion promoter according to claim 1, to a substrate.

12. The process according to claim 11, wherein the substrate is metal, concrete, wood, glass, plastic, and/or a composite material.

13. The adhesion promoter according to claim 1, wherein A is in each case independently an alkyl radical having 1 to 4 carbon atoms.

14. The adhesion promoter according to claim 1, wherein B is in each case independently a radical of the formula (4b)

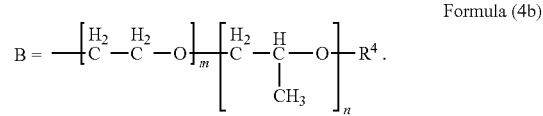

15. The adhesion promoter according to claim 1, wherein B is in each case independently a radical of the formula (4c)

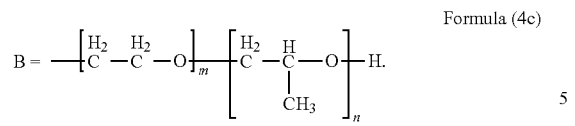

Formula (4c)

16. The adhesion promoter according to claim 1, wherein $R^3$ is in each case independently a tert-butylphenyl radical or an o-cresyl radical.

17. The adhesion promoter according to claim 2, wherein m, n, o, p and q are each independently 0 to 50, with the proviso that the sum total of m, n, o, p and q is greater than 10.

18. The adhesion promoter according to claim 3, wherein the number-average molar mass $M_n$ of the polybutadiene is from 700 g/mol to 5,000 g/mol.

19. The adhesion promoter according to claim 4, wherein the polybutadiene has 0% to 5% of the double bonds present as 1,2 vinyl double bonds, and 95% to 100% of the double bonds present as 1,4 double bonds.

20. The adhesion promoter according to claim 5, wherein the average molar mass of B is from 400 g/mol to 5,000 g/mol.

* * * * *